US011243971B2

(12) United States Patent
Geigel

(10) Patent No.: US 11,243,971 B2
(45) Date of Patent: Feb. 8, 2022

(54) SYSTEM AND METHOD OF DATABASE CREATION THROUGH FORM DESIGN

(71) Applicant: Atlantic Technical Organization, San Juan, PR (US)

(72) Inventor: Arturo Geigel, San Juan, PR (US)

(*) Notice: Subject to any disclaimer, the term of this patent is extended or adjusted under 35 U.S.C. 154(b) by 249 days.

(21) Appl. No.: 16/235,369

(22) Filed: Dec. 28, 2018

(65) Prior Publication Data

US 2020/0210441 A1 Jul. 2, 2020

(51) Int. Cl.
*G06F 16/25* (2019.01)
*G06F 16/22* (2019.01)
*G06F 3/0486* (2013.01)
*G06F 16/21* (2019.01)

(52) U.S. Cl.
CPC .......... *G06F 16/252* (2019.01); *G06F 3/0486* (2013.01); *G06F 16/211* (2019.01); *G06F 16/2237* (2019.01)

(58) Field of Classification Search
None
See application file for complete search history.

(56) References Cited

U.S. PATENT DOCUMENTS

| | | | | |
|---|---|---|---|---|
| 5,778,375 A * | 7/1998 | Hecht | ................... | G06F 16/284 |
| 5,806,066 A * | 9/1998 | Golshani | ............... | G06F 16/289 |
| 9,384,202 B1 * | 7/2016 | Tang | ..................... | G06F 16/134 |
| 10,489,355 B1 * | 11/2019 | Messmer | ............. | G06F 16/211 |
| 2005/0102303 A1 * | 5/2005 | Russell | ................ | G06F 16/211 |
| 2007/0260612 A1 * | 11/2007 | Papakonstantinou | ....... | G06F 16/972 |
| 2009/0006448 A1 * | 1/2009 | Pall | ........................ | G06F 16/83 |
| 2009/0216799 A1 * | 8/2009 | Manjrekar | ............ | G06F 16/217 |
| 2012/0290940 A1 * | 11/2012 | Quine | .................. | G06F 16/212 715/744 |
| 2016/0248888 A1 * | 8/2016 | King | ..................... | G06F 16/958 |
| 2017/0115968 A1 * | 4/2017 | Fukala | ................. | G06F 16/213 |

* cited by examiner

*Primary Examiner* — Tony Mahmoudi
*Assistant Examiner* — Umar Mian
(74) *Attorney, Agent, or Firm* — Luis Figarella

(57) ABSTRACT

A system and method of generating a database schema from a graphical user interface used to create a form. The embodiments discloses the system that utilizes a drag and drop application that allows for configuration of a plurality of forms. These forms can then be placed in a graphical flow that will dictate the order of the forms. Through its graphical user interface, the system is able to gather information on field structure, flow among form elements, element identification, among other embodiments. This information allows the system to automate the creation of the database schema without user intervention.

15 Claims, 9 Drawing Sheets

SYSTEM AND METHOD OF DATABASE CREATION THROUGH FORM DESIGN

FIELD OF THE INVENTION

The present invention relates to the field of database design specifically database schema creation via a graphical user interface

BACKGROUND OF THE INVENTION

Traditional programming done in computer systems needs to store information in some kind of permanent storage. While this can be accomplished on simple text files, the complexities of today's information requires a more structured form of storage. Some of the technologies that have been created to facilitate this task range from XML and JSON formats to full blown relational database management systems and NoSQL databases.

The multiplicity of programming languages and their respective complexity coupled with the complexity of permanent storage systems have given rise to specialization where management of storage systems and programming have to be done by different individuals. Some efforts have been made with the WYSIWYG (What You See Is What You Get) editors have enabled the automatic generation of programming code related to forms and to hide the complexity of systems programming for the most common tasks. The versatility of these systems even allow the user to connect the forms to already existing databases. Unfortunately, the number of state of the art systems that utilizes WYSIWYG editor to generate forms that connect to databases and also integrate schema generation is extremely limited.

DESCRIPTION OF THE PRIOR ART

What can be considered the best representation of the current state of the art in WYSIWYG that fuses both the code generation and database integration that includes schema generation is U.S. Pat. No. 8,683,315 B2. While this state of the art representative includes database schema generation, it is severely limited and is only useful under extremely restrictive instances. The invention allows the creation and modification of a database schema.

The schema generation on the U.S. Pat. No. 8,683,315 B2 follows from the schema generation interface where "the user desires to use a preexisting schema for a common type of form . . . then the user selects a schema suggested by the system based on the form input elements included on the form interface". In addition the system may "scan the form elements and determine that the user has a high probability of implementing a guest book, for example, in which case a schema or list of guest book Schemas is presented to the user for selection". Alternatively, "the system may present code generation interface at any point in the process and the user may, for example, edit the generated schema and/or SQL-file."

The embodiments described above by this representative of the state of the art is reliant on predefined templates to be matched and does not provide a true SQL schema generation which may contain form fields outside of those provided by the templates. The patent representative also is mute on how does the application generates those templates. Based on the information provided, someone skilled in the art will likely come to the conclusion that it needs a database programmer to pre-design the templates. This defeats the purpose of automatic generation and truly automated system behavior by shifting the problem to pre-design by a person with database knowledge.

Truly automated systems in schema generation presents some real challenges that are non-obvious and difficult to solve. The first is to enable a system to generate the schema by gathering information that must be inferred from user generated fields. This is a challenge since a field could be well written as "name", "last name" or alternatively can be written as "al", "a2" respectively. The second challenge is even if the fields are properly labeled in a form, the relationships may not be evident such as "name" "name of spouse" and "sex". The last example, may refer to the sex of the person filling the form field name.

The state of the art representative is limited to relational databases and does not cover other forms of database such as semi structured document databases such as XML databases and other databases such as NOSQL databases.

SUMMARY OF THE INVENTION

The present invention overcomes the limitations of the Prior art in the generation of the database schema when using a WYSIWYG to construct forms. Therefore, one of the objectives of the present invention is to provide a system that generates the database schema from information gathered by inferences from user generated fields on the WYSIWYG Another objective is to allow the system to guide the user through its WYSIWYG interface to properly label form fields that can be used to infer information as to the relationship between fields on the form. This information can then be leveraged by the system during the process of database normalization or storage optimization on semi structured documents such as XML or JSON.

Another objective is to allow the system to gather information on how multiple forms interact with one another in a transactional flow that consists of multiple forms and decisions among the forms shown to the user based on the fields that are filled by the user.

The invention itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE PREFERRED EMBODIMENTS

Those with skill in the computing arts will recognize that the disclosed embodiments have relevance to the automatic creation of a database schema. Such creation can have a meaningful impact on the amount of hardware necessary to execute the database in an efficient manner. Especially, the efficient implementation depends on the need to conserve disk space and the amount of virtual memory, caching and Random access memory required. This is also crucial if the conceived embodiments are not just implemented on high end expensive system but embedded systems and other relevant computing architectures. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
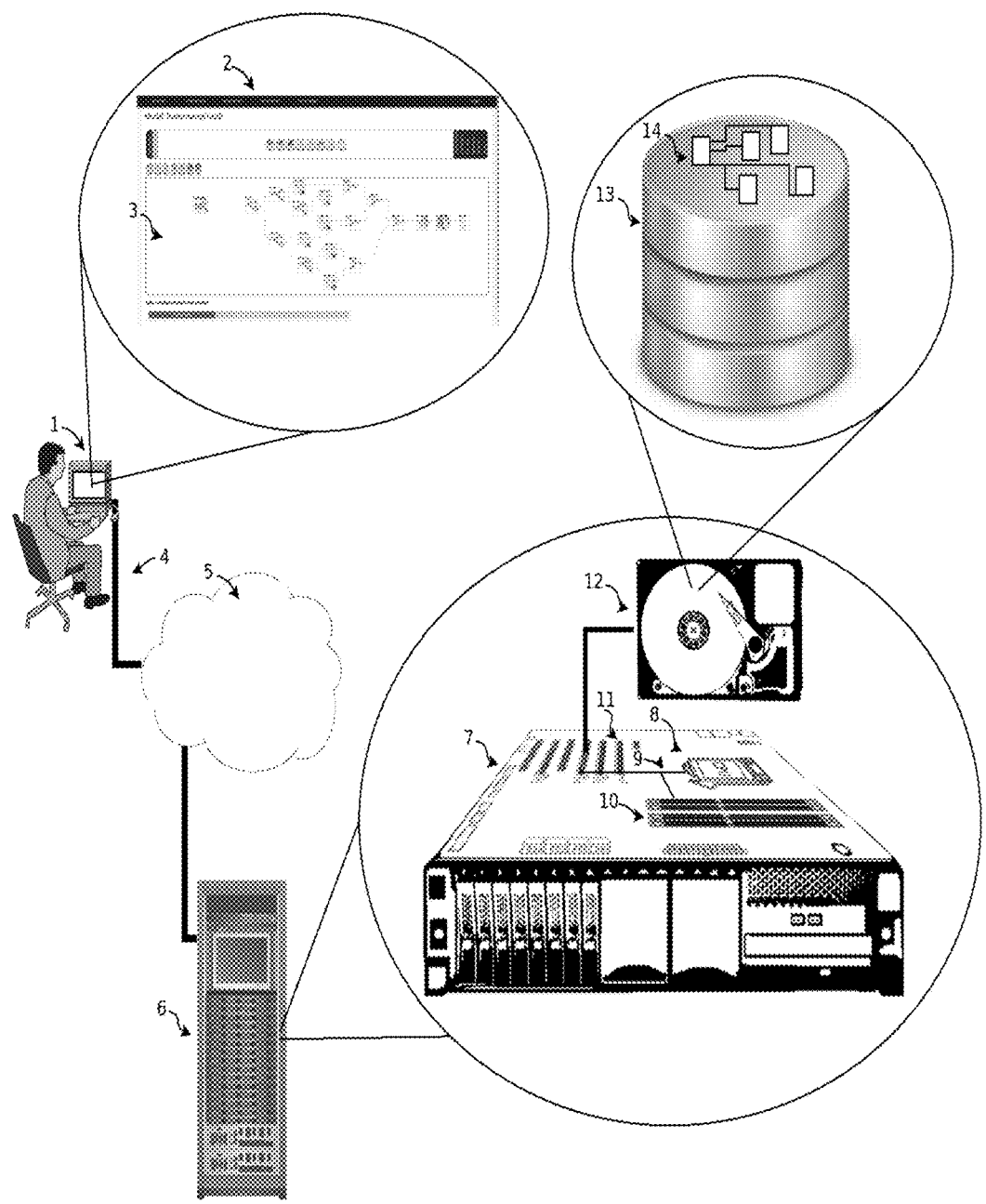
FIG. 1 presents a depiction of the overall system.

FIG. 1 presents a depiction of the overall system of an embodiment of the proposed system where a person utilizes a computer system 1 to interact with an application interface 2. The application interface 2 may completely or partially reside on the computer system 1. The application interface 2 provides a graphical representation of a flow 3. Once the user finishes configuring the graphical representation of flow 3, the user can communicate through a communications line 4 to a remote location 5 that is a site that houses a server system 6. The communications line 4 is typically embodied to operate in a networked environment using logical connections to one or more remote computers, such as a remote server system 6. An alternate embodiment may forego the remote location in favor of being located locally close to the user in the same facility. The communications line 4 include a local area network (LAN) and a wide area network (WAN), but may also include other networks. Such networking environments are commonplace in offices, enterprise-wide computer networks, intranets and the Internet and is well known to those skilled in the arts. For example, in the subject matter of the present application, the computer system 1 may comprise the source machine from which data is being migrated, and the remote server system 6 may comprise the destination machine. Note however that source and destination machines need not be connected by a network or any other means, but instead, data may be migrated via any media capable of being written by the source platform and read by the destination platform or platforms. When used in a LAN or WLAN networking environment, the computer 1 is connected to the LAN through a network interface or adapter. When used in a WAN networking environment, the computer 1 typically includes a modem or other means for establishing communications over the WAN, such as the Internet. The modem, which may be internal or external, may be connected to the system bus via the user input interface or other appropriate mechanism. In a networked environment, program modules depicted relative to the computer 1, or portions thereof, may be stored in the remote memory storage device. By way of example, remote application programs may reside on memory device. (twill be appreciated that the network connections shown are exemplary and other means of establishing a communications link between the computers may be used.

The server system 6 in its typical embodiment is made up of a server 7 or a plurality of them. The server system 7 typically consists of a CPU system 8 that connects to a bus 9. The bus 9 also connects to memory modules 10 and 1/0 device connector 11. 1/0 connector 11 connects to a storage disk 12. Such representation of storage disk 12 can have an alternate embodiment such as solid state device, GPU RAM, optical disk or other storage facility.

Figure 2:
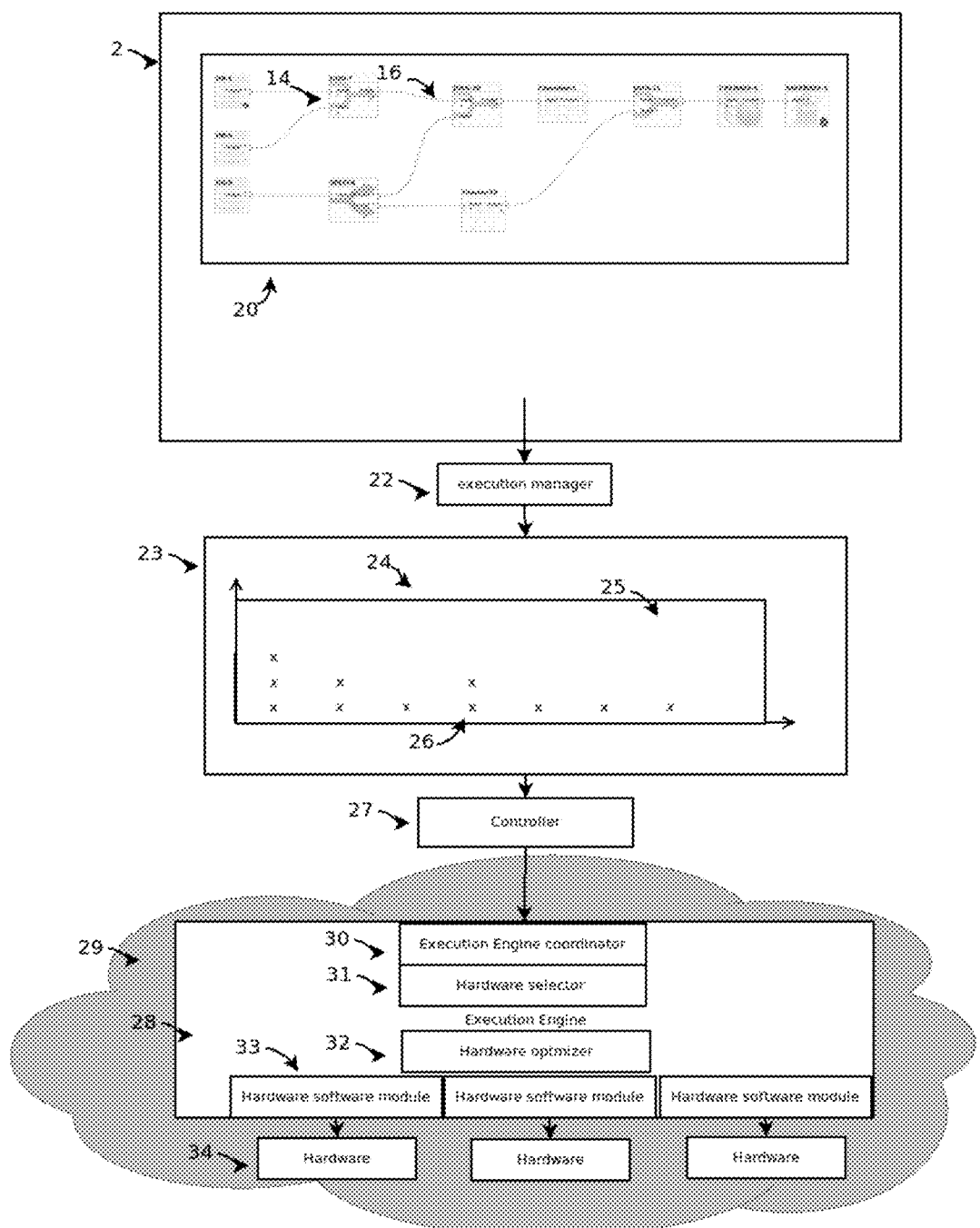
FIG. 2 displays a representation of the major components of the proposed system that will process a generic designed flow including the proposed database schema generation.

FIG. 2 displays a graphical representation of the major components of the proposed system that will process a generic deigned flow including the proposed database schema generation. The system starts with the interface system 2 that has a functionality icons 14 that have the configuration that the system will execute and are connected via a link 16 together to form an execution program 20. Once the execution program 20 is finished in its design the program will be forwarded to an execution manager 22. The execution manager 22 will reside on the remote server system 6. The execution manager 22 will produce an execution map 23 based on the execution program 20. The execution map 23 contains an execution matrix 24 that will store the order of the execution for the execution program 20. Each entry in the execution matrix 24 is assigned an execution slot 25 that can be filled with an execution entry 26 that corresponds to functionality icon 14. Once the execution map 23 is completed it is passed to a controller 27 that also resides on server remote system 6. The controller coordinates the execution with an execution engine 28 across the cloud environment 29. The controller 27 communicates to an execution engine coordinator 30 that resides on one of n remote server system 6 of cloud environment 29. The execution engine coordinator 30 uses a hardware selector 31 to discriminate which component of remote server system 6. For example, hardware selector 31 can choose between execution hardware including but not limited to CPU, GPU multithreading or other processing technology and hard drive, optical media or other storage medium. Once hardware selector 31 chooses the particular processing technology, the hardware selector 31 selects a hardware optimizer 32 which coordinates with a hardware software module 33 that contains the necessary routines to interact with an hardware 34. An alternate embodiment might also include a non-cloud environment where all components run on a single system and includes the specified components to run on a single system. Such alternate embodiment can be easily be conceived by someone skilled in the art from the already disclosed description.

Figure 3:
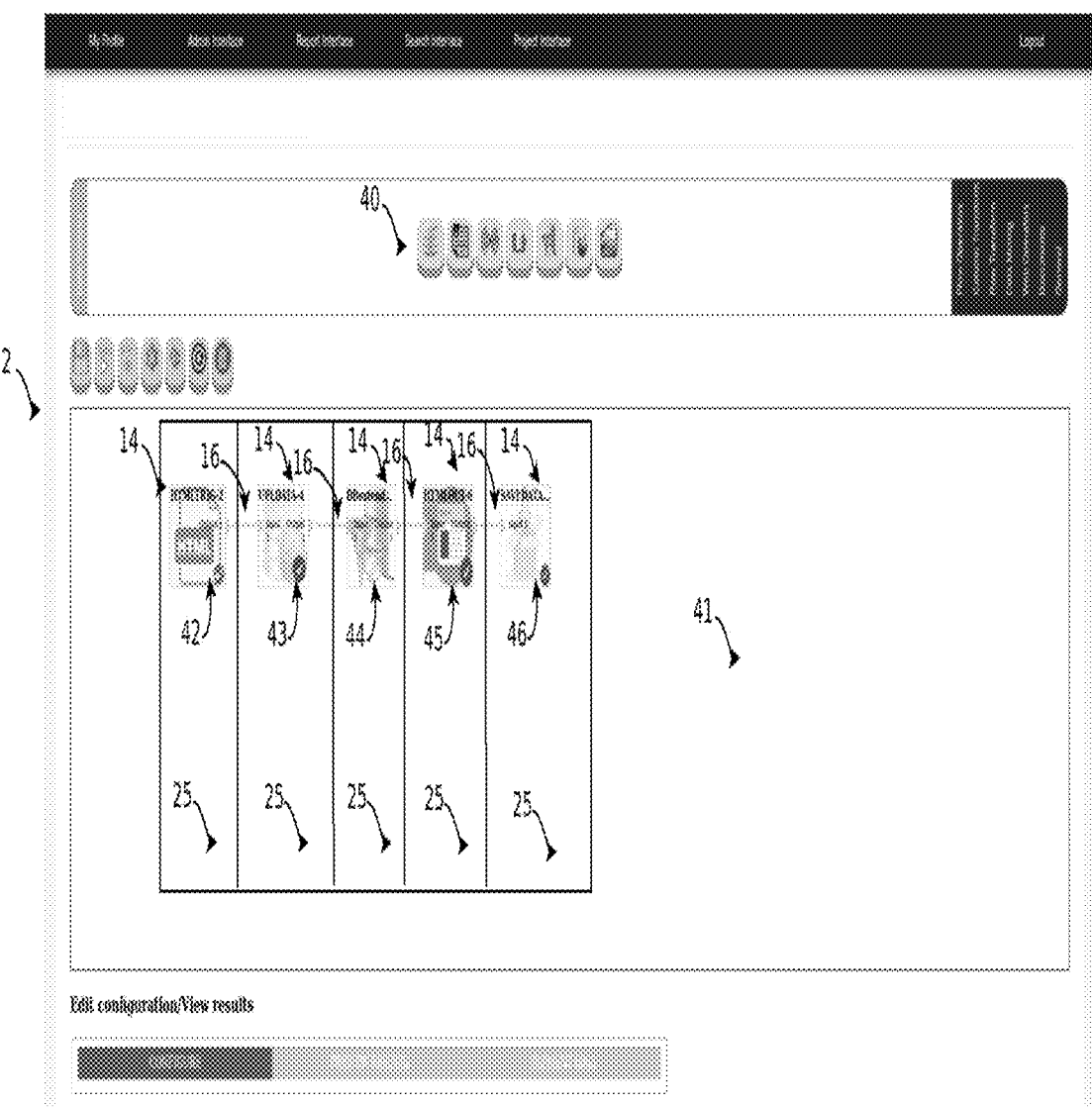
FIG. 3 displays the application interface with specific functionality icon and links that form the schema creation in an execution program.

FIG. 3 displays the application interface 2 with specific functionality icon 14 and link 16 together to form the schema creation in an execution program 20. Each of the icon 14 represents a configuration interface that are interlinked together via link 16. The application interface 2 takes the configuration from each interface represented via the plurality of icon 14 and converts it into an executing program. This program is passed then to execution manager 22 to execute the program in remote server system 6. The figure shows a plurality of icon 14 that are placed in their respective execution slot 25 depicted by the black lines surrounding each functionality icon 14. The application interface 2 contains icons button 40 that can then be placed on a canvas 41 and in this way become functionality icon 14 and be connected by link 16. The plurality of icons 14 in their respective execution slot 25 that together constitute a transaction template in a graphical form start out with an icon 42 which is an initiator in the desired execution order. The icon 42 is the icon responsible in bringing the configuration menu for the initial form and the database creation. Additionally the icon 42 is the entry point of a user transaction. An icon 43 placed after icon 42 receives the information from the created database and can map the information submitted from the form created and insert it into the database. After icon 43 comes icon 44 that extracts information from the database and shows the results to the user through icon 45. The graphical representation of the transaction template ends when the icon 45 gives way to a transaction terminator icon 46 which signal the application to end.

Figure 4:
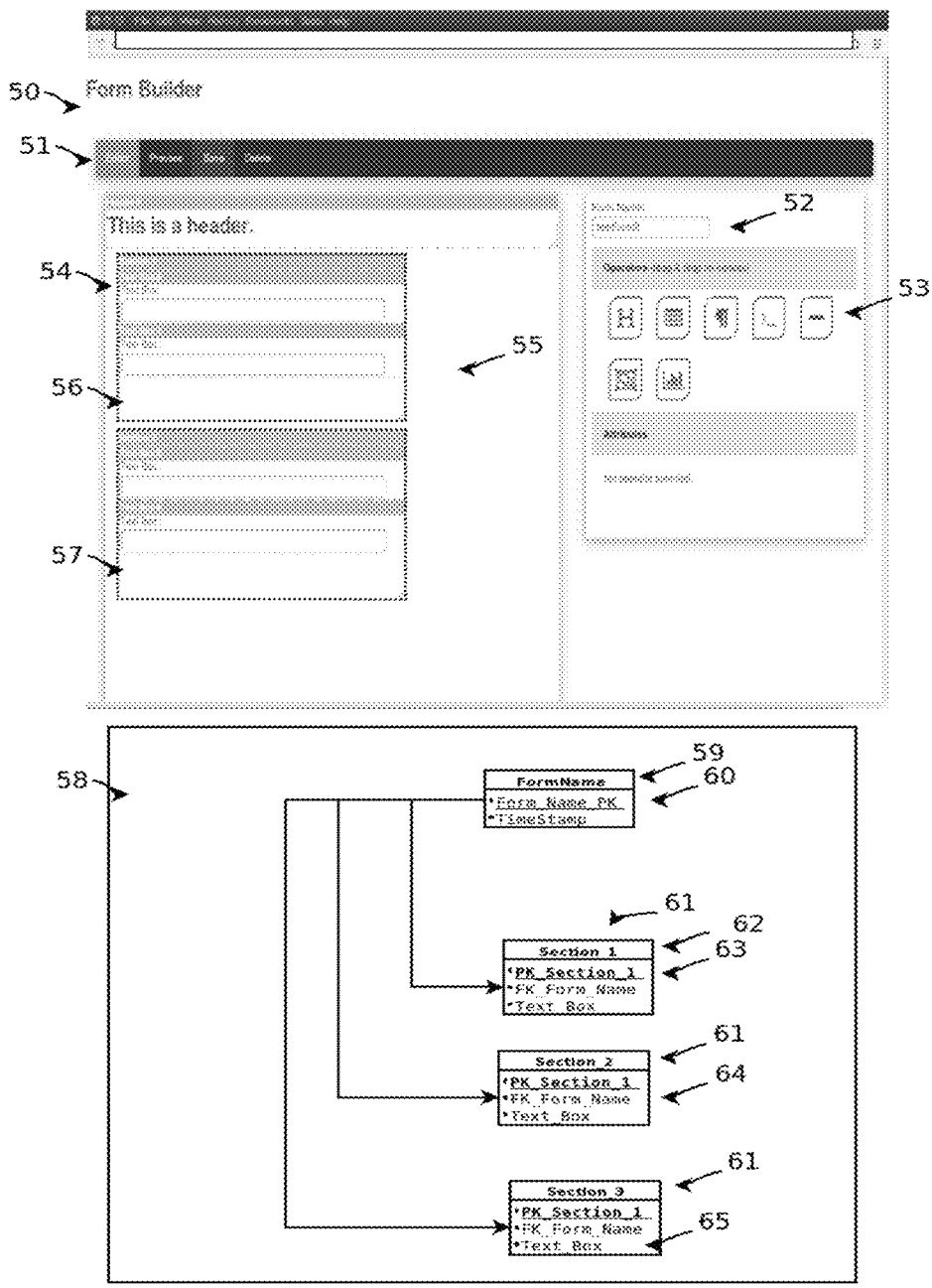
FIG. 4 presents the form interface where the user configures the form fields and the respective positioning within the form.

FIG. 4 presents the form interface where the user configures the form fields and the respective positioning within the form. The form interface 50 is presented to the user when he clicks on the icon 42 of the application interface 2. The form interface 50 has a top menu 51 that allows the user to have an editor mode a preview of the final design a save functionality and delete functionality. The form interface 50 also has a form name field where the user identifies the name of the form. The form interface 50 further contains a form name 52 and an icon buttons 53 that are form elements such as a text field 54 that can be dragged and dropped into a canvas 55. Fields such as text field 54 are accepted on the canvas 55 as long as they fall into a section 56. Additional sections can be added besides section 56 such as a section 57 and other sections as deemed relevant by either application defaults or user addition.

From the interface a database can be generated such that the form name extracted from form name 52 and placed in a database schema 58 as a main table name 59. The main table 59 contains relevant columns such as the form name primary key 60. Other column elements that can be part of the embodiment are but not limited to timestamp, form metadata, section metadata among others. A table 61 can be created based on a respective section 56. Table 61 can then be identified by giving a table name 62 based on section 56. A Primary key 63 identifies each entry on table 61 and is a required column to identify each entry made through the form represented in canvas 55. The table 61 also needs to include a foreign key 64 that maintains the relationship with main table 59 and the other tables in the database for each entry. The table 61 also includes data field 65 which inserts the information entered on the input area such as text field 54 by the user via form represented by canvas 55. The data entry is not limited to text field 54 but any additional data entry representation given by the operations supplied by icon buttons 53.

Figure 5:
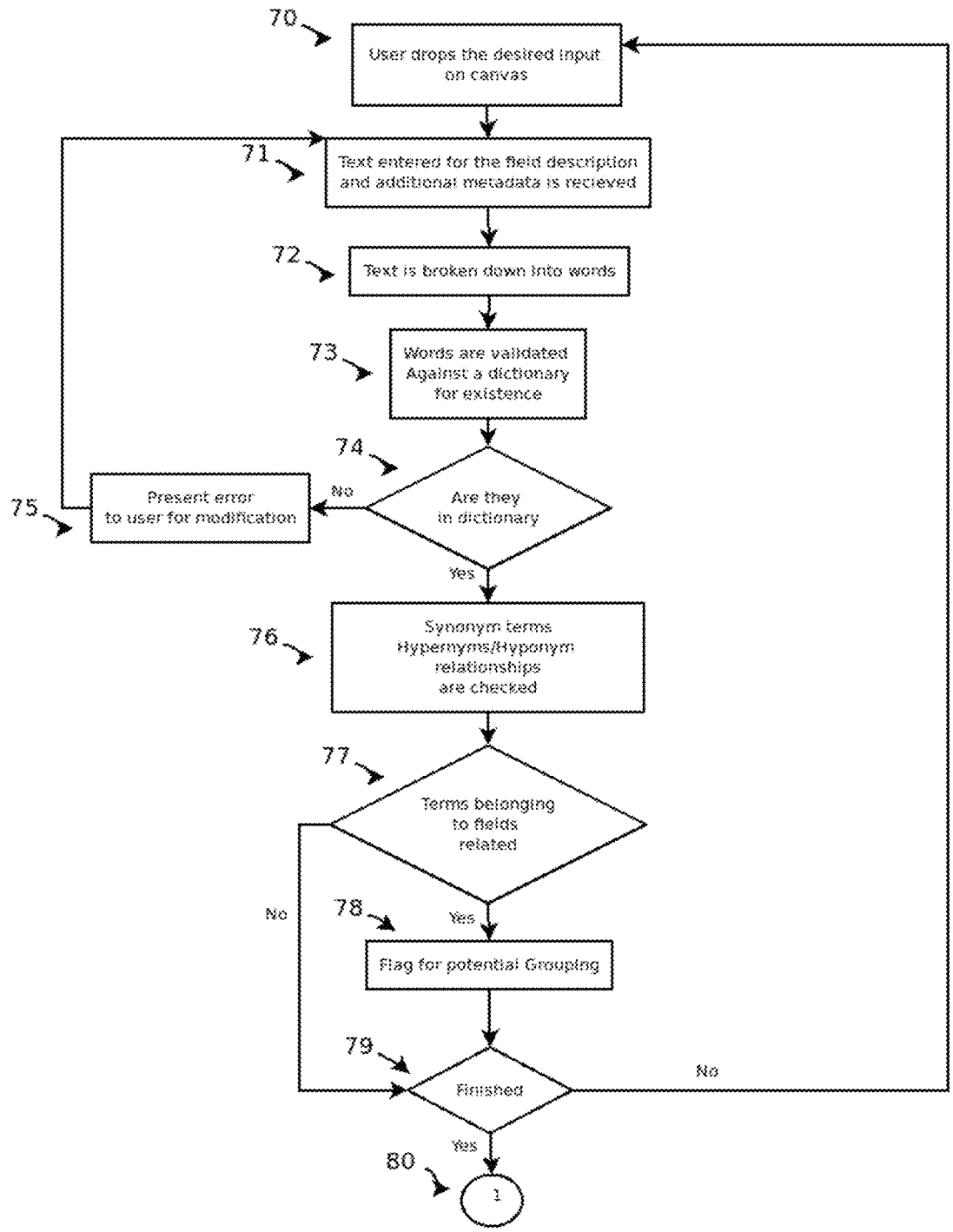
FIG. 5 presents a flowchart of the field information validation process.

FIG. 5 presents a flowchart of the field information validation process. The figure start with a step 70 where the user drag and drops icon buttons 53 with the desired input field representation on canvas 55. When the user drops the desired input field on step 70 a step 71 is triggered where the relevant information fields are shown to the user to enter the name for the field and additional space for metadata. Said name and metadata are used to identify the field on canvas 55. The text supplied in step 71 is broken down into individual words in a step 72. The individual words obtained in step 72 are validated in a step 73 with a dictionary to see if they are acceptable words in the language. Additional validation steps can be carried out in an alternate embodiment before step 73 such as minimum length of 4 characters such as to avoid words such as 'is', 'but', 'the' among other words with minimal descriptive use. The step 73 is followed by a decisional step 74 that instructs the process on negative results to go to a step 75 where the user is presented with a notification. The notification informs the user that the terms are not in the dictionary and the step 75 guides the user to enter additional text or modify the entry in step 71. If step 74 positively asserts that words are in the dictionary a step 76 is executed where the entries are searched for synonyms, hypernym/hyponym relationship among the terms. The embodiment is not limited to just synonyms, hypernym/hyponym but includes additional relationships such as antonyms, sense disambiguation among other lexical and even semantic relationships such as semantic role labeling for metadata and fields. The relationships found in step 76 are used in a decisional step 77 where the words corresponding to different fields are compared for their respective relationships among each other. If decisional step 77 is positive, a grouping step 78 is implemented where fields having relationships among them are grouped together. Step 77 answered in the negative and the step 78 lead to a decisional step 79 that if the user is not finished with the form it leads back to step 70, else it goes to the next steps of the process in a step 80.

Figure 6:
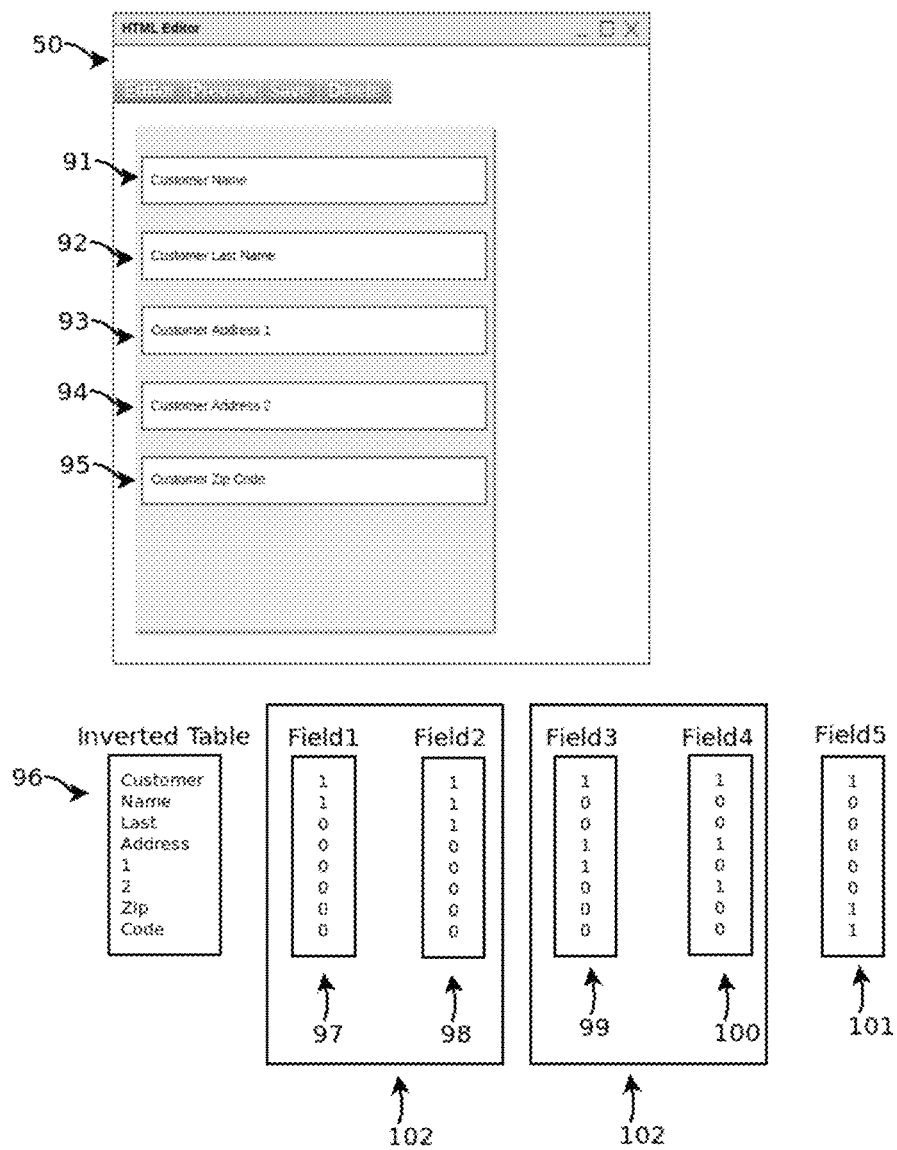
FIG. 6 shows the graphical user interface and a vector space representation.

FIG. 6 shows the graphical user interface and a vector space representation. FIG. 6 shows an alternate representation of form interface 50. Form 50 shows a field 91 that has been labeled 'customer name'. Form 50 also includes a field 92 labeled 'customer last name', a form field 93 labeled 'customer address I', a field 94 labeled 'customer address 2' and a field 95 labeled 'customer zip code'. All fields' labels of form 50 are then parsed into individual words and an inverted index 96 is created. Field 91 is converted into a vector 97, field 92 is converted into a vector 98, field 93 is converted into a vector 99, field 94 is converted into a vector 100 and field 95 is converted into a vector 101. Vectors 97, 98, 99,100 and 101 are created by checking if the respective entry in the inverted index is part of the label. If the index entry is found in the label then a 1 is inserted else the entry is assigned a value 0 for that vector. The vectors that score close together can be assigned into a group 102.

Figure 7:
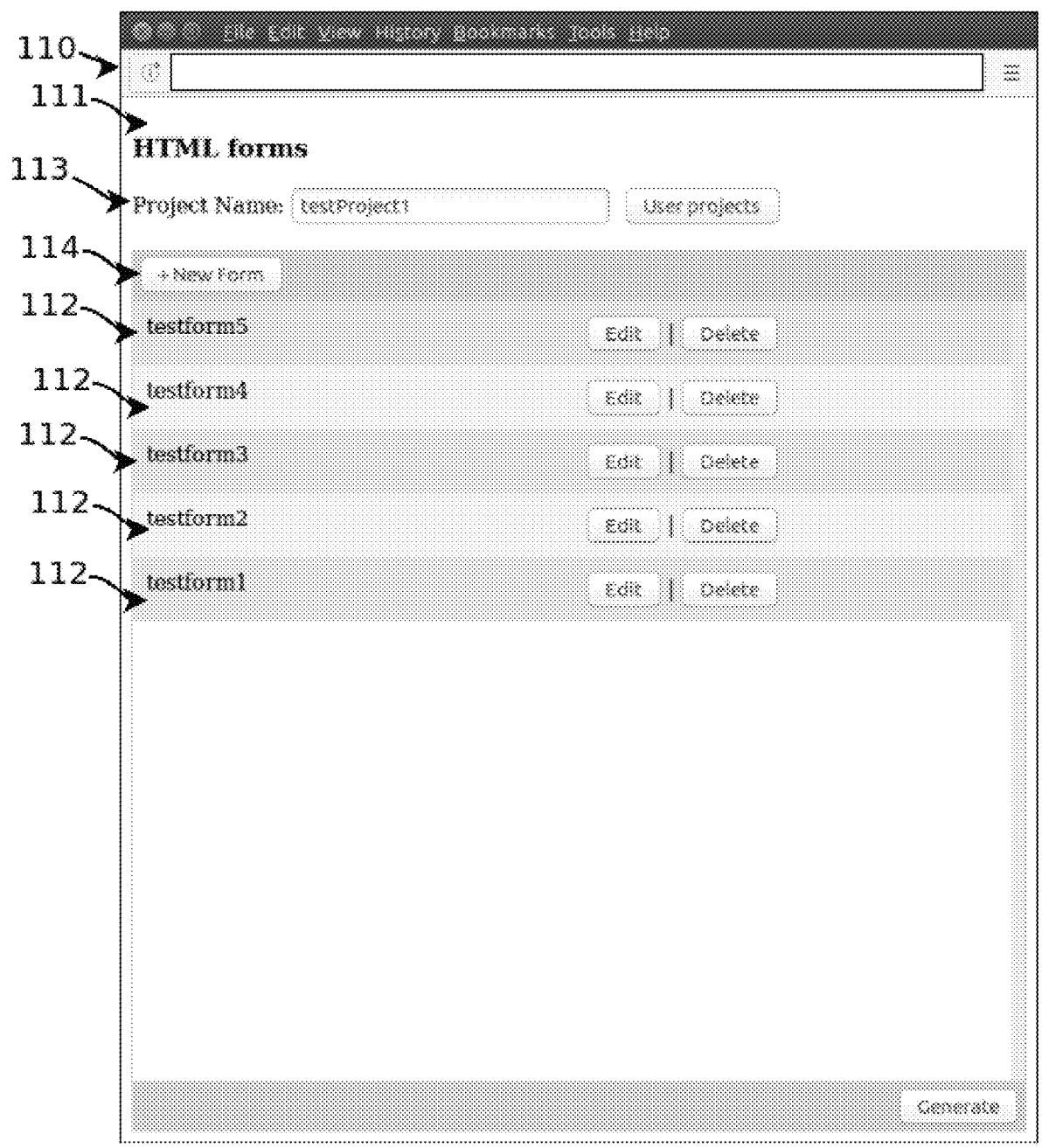
FIG. 7 shows a graphical user interface that displays multiple forms.

FIG. 7 shows a graphical user interface that displays multiple forms. A graphical user interface 110 displays an interface 111. The interface 111 displays a form 112. Several forms 112 can be displayed in the interface as needed to generate a complex data entry process. All instances of form 112 can be brought under a project name 113 and stored in a database under the project name 113 identifier. New forms can be added to the project under project name 113 by using an addition button 114.

Figure 8:
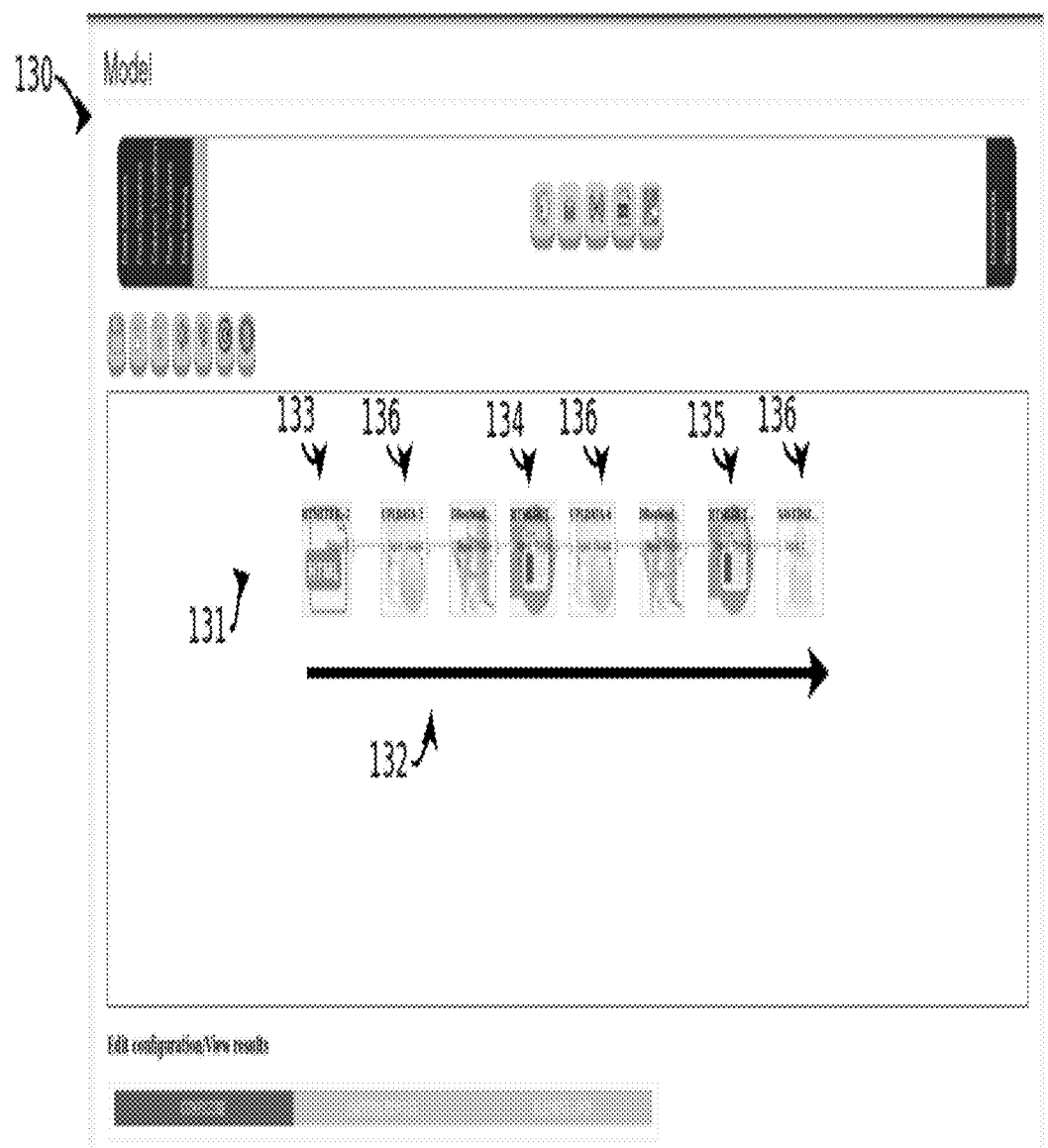
FIG. 8 displays a typical transactional flow with multiple forms

FIG. 8 displays a typical transactional flow with multiple forms. A user interface 130 displays a transactional flow 131. The transactional flow direction is represented by an arrow 132. The transactional flow has an icon 133, an icon 134 and an icon 135 that represent the insertion on the flow of form interface 50 and its underlying execution functionality of displaying its respective form for input. An icon 136 represents the configuration for directing the system to accept the form information from the forms and insert them into the database. Such decoupling of icon 133, icon 134 and icon 135 that display the form and icon 136 that inserts the database is representative but not limited to architectures such as client server communication m web programming. In such communication architecture, the display is managed independently as client side programming and the functionality that executes the processing of information is managed by the server.

Figure 9:
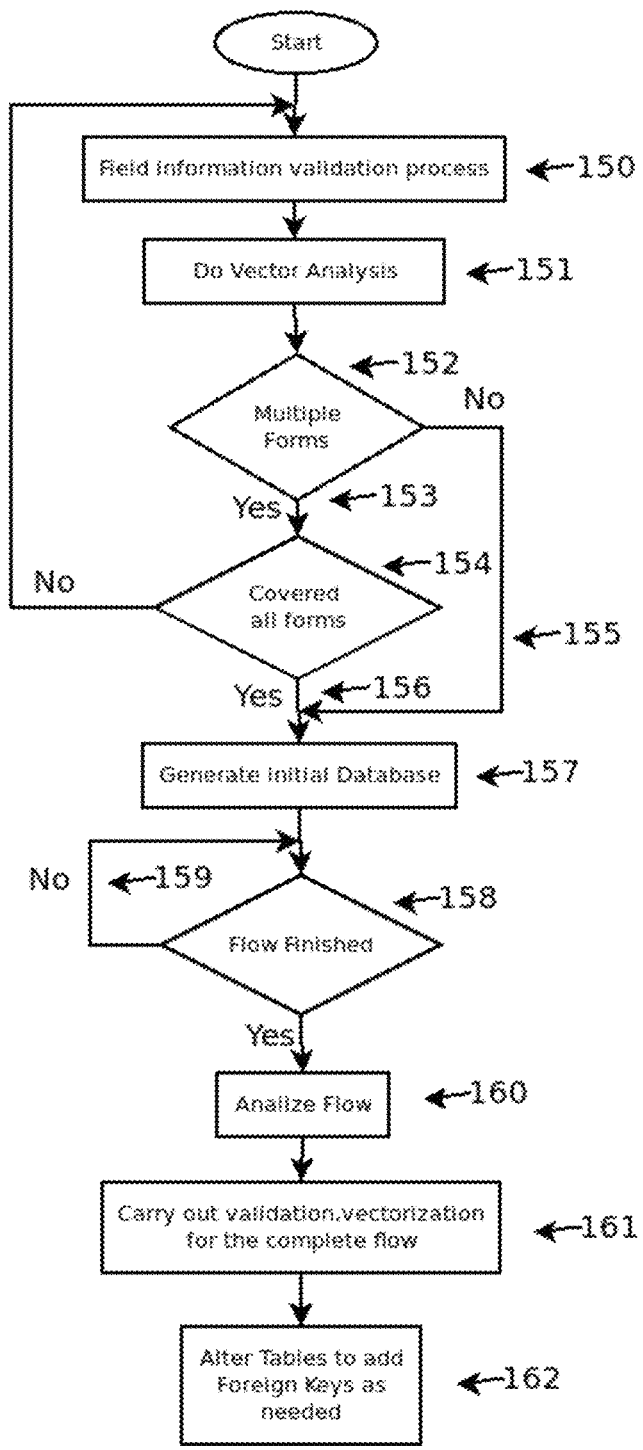
FIG. 9 is a flowchart of the database schema creation process on multiple forms used in a transactional flow.

FIG. 9 is a flowchart of the database schema creation process on multiple forms used in a transactional flow. The process starts with a single page being received for processing in a step 150 that does the field information validation process described by FIG. 5. A step 151 follows step 150 where the vector analysis of FIG. 6 is carried out. Following step 151 a step 152 verifies if there is more than one form to process in the programming that executes the processing of graphical user interface 110 of FIG. 7. If validation in step 152 determines that there are multiple forms, then the process will take a path 153 to a stopping criteria in a step 154. If step 154 is negative, then it will return to the beginning of the flow and repeat until all forms are processed. If step 152 is negative it will take a path 155 that will join with a path 156 coming from step 154 that ends in a step 157 that will create the initial database for a single or multiple forms. After generating the initial database in step 157 a step 158 will monitor user interface 130 to determine if the user completed the intended flow and will continue in a loop 159 until the flow on interface 130 is finished. Once the flow is finished as validated in step 158 a step 160 will analyze the flow and determine the position of the forms within the flow. This analysis will assign a high probability that forms in the beginning of the flow will generate primary keys which will act as foreign keys in subsequent forms if they are connected in a path dependent fashion. A step 161 following step 160 will carry out the grouping through vectorization and validation through the multiple forms that are present in the flow. Based on the analysis of step 160 and step 161 a step 162 will reorganize the tables by altering their structure or adding foreign keys to reflect the new relationships. These new relationship changes can embody doing normalization based on matching similar fields, adding foreign keys to subsequent forms and grouping sections or separating them based on vectorization and synonyms, hypernym/hyponym relationships. This embodiment is not limited only to relational databases but can be utilized in other database types such as XML databases or similar databases.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof The details in the patents, patent applications, and publications incorporated by reference herein may be considered to be incorporable at applicant's option, into the claims during prosecution as further limitations in the claims to patently distinguish any amended claims from any applied prior art.

What is claimed:

1. A system for database schema creation through analysis of a transactional flow on a graphical user interface, said system comprising:
   at least one processor;
   at least one memory module;
   at least one database;
   an application interface that provides a graphical representation of said transactional flow, wherein:
   said application interface contains a canvas graphical representation where one or more icons are placed on a canvas, with each said icon representing a configuration interface interlinked by one or more links;
   said application interface allows for the selection of one of said icons as the initiator of the desired execution order of said transactional flow and the remaining icons on said canvas are each placed in their respective execution slots within said transactional flow execution order and interlinked to represent said transactional flow;
   said application interface contains a transactional form graphical interface that allows for the creation of one or more transactional forms, each said transactional form having a graphical representation as one of said icons and a mechanism for mapping the information submitted from said transactional forms and inserting into one or more tables within a database;
   said transaction flow is analyzed to determine the position of said transactional forms within said flow and determine transactional forms in the beginning of said flow will generate relationships to be recorded within said one or more tables within a database;
   wherein said transactional form graphical interface comprises a plurality of sections, each said section comprising a section name and a plurality of fields, each said field comprising a field name;
   wherein said form graphical interface is configured to receive input from a user to enter into said plurality of fields;
   wherein said form graphical interface is further configured to organize a plurality of resulting transactional forms on a graphical flow;
   a validation module configured to: determine if said section names and field names comprise acceptable vocabulary, parse said field names into individual words, create an index based on said individual words, convert each word in said field names into a plurality of vectors, determine which words in said index are present in said plurality of vectors, assign a score to each vector in said plurality of vectors based on which words from said index are present and group together vectors that have similar scores;
   wherein said form graphical interface is configured to generate a database schema with table names based on said section names and columns based on said plurality of vectors; and
   determining if said section and field names comprise acceptable vocabulary and verifying that said section and field names exist in a dictionary, ontology or predetermined word list.

2. The system of claim 1, further comprising:
determining if said section and field names comprise acceptable vocabulary and detecting that said section and field names contain a minimum length of characters.

3. The system of claim 2 wherein:
said system performs validation of said section and field names to ensure that said section and field names exist in the language that is being used for the application.

4. The system of claim 1, wherein:
said plurality of fields comprises text fields and icon buttons.

5. The system of claim 4 wherein:
said system performs validation of said section and field names to ensure that said section and field names exist in the language that is being used for the application.

6. The system of claim 1, wherein:
said form interface comprises a plurality of transactional forms.

7. The system of claim 6 wherein:
said system performs validation of said section and field names to ensure that said section and field names exist in the language that is being used for the application.

8. A method for database schema creation through analysis of a transactional flow on a graphical user interface, said method comprising the steps of:
providing at least one processor;
providing at least one memory module;
providing at least one database;
providing an application interface that provides a graphical representation of said transactional flow, wherein:
said application interface contains a canvas graphical representation where one or more icons are placed on a canvas, with each said icon representing a configuration interface interlinked by one or more links;
said application interface allows for the selection of one of said icons as the initiator of the desired execution order of said transactional flow and the remaining icons on said canvas are each placed in their respective execution slots within said transactional flow execution order and interlinked to represent said transactional flow;
said application interface contains a transactional form graphical interface that allows for the creation of one or more transactional forms, each said transactional form having a graphical representation as one of said icons and a mechanism for mapping the information submitted from said transactional forms and inserting into one or more tables within a database;
said transaction flow is analyzed to determine the position of said transactional forms within said flow and determine transactional forms in the beginning of said flow will generate relationships to be recorded within said one or more tables within a database;
wherein said transactional form graphical interface comprises a plurality of sections, each said section comprising a section name and a plurality of fields, each said field comprising a field name;
wherein said form graphical interface is configured to receive input from a user to enter into said plurality of fields;
wherein said form graphical interface is further configured to organize a plurality of resulting transactional forms on a graphical flow;
a validation module configured to: determine if said section names and field names comprise acceptable vocabulary, parse said field names into individual words, create an index based on said individual words, convert each word in said field names into a plurality of vectors, determine which words in said index are present in said plurality of vectors, assign a score to each vector in said plurality of vectors based on which words from said index are present and group together vectors that have similar scores; and
wherein said form graphical interface is configured to generate a database schema with table names based on said section names and columns based on said plurality of vectors;
determining if said section and field names comprise acceptable vocabulary and verifying that said section and field names exist in a dictionary, ontology or predetermined word list.

9. The method as of 8, further comprising:
determining if said section and field names comprise acceptable vocabulary and detecting that said section and field names contain a minimum length of characters.

10. The method of claim 9 further comprising:
performing validation of said section and field names to ensure that said section and field names exist in the language that is being used for the application.

11. The method of claim 8, wherein:
said plurality of fields comprises text fields and icon buttons.

12. The method of claim 11 further comprising:
performing validation of said section and field names to ensure that said section and field names exist in the language that is being used for the application.

13. The method of claim 8, wherein:
said form interface comprises a plurality of forms.

14. The method of claim 13 further comprising:
performing validation of said section and field names to ensure that said section and field names exist in the language that is being used for the application.

15. A non-transitory computer-readable medium embodying a program executable by at least one computing device, the program when executed causing said at least one computing device to do the following:
using at least one processor;
using at least one memory module;
accessing at least one database;
providing an application interface that provides a graphical representation of said transactional flow, wherein:
said application interface contains a canvas graphical representation where one or more icons are placed on a canvas, with each said icon representing a configuration interface interlinked by one or more links;
said application interface allows for the selection of one of said icons as the initiator of the desired execution order of said transactional flow and the remaining icons on said canvas are each placed in their respective execution slots within said transactional flow execution order and interlinked to represent said transactional flow;
said application interface contains a transactional form graphical interface that allows for the creation of one or more transactional forms, each said transactional form having a graphical representation as one of said icons and a mechanism for mapping the information submitted from said transactional forms and inserting into one or more tables within a database; and
said transaction flow is analyzed to determine the position of said transactional forms within said flow and determine transactional forms in the beginning of said flow will generate relationships to be recorded within said one or more tables within a database;

wherein said transactional form graphical interface comprises a plurality of sections, each said section comprising a section name and a plurality of fields, each said field comprising a field name;

wherein said form graphical interface is configured to receive input from a user to enter into said plurality of fields;

wherein said form graphical interface is further configured to organize a plurality of resulting transactional forms on a graphical flow;

a validation module configured to: determine if said section names and field names comprise acceptable vocabulary, parse said field names into individual words, create an index based on said individual words, convert each word in said field names into a plurality of vectors, determine which words in said index are present in said plurality of vectors, assign a score to each vector in said plurality of vectors based on which words from said index are present and group together vectors that have similar scores; and wherein said form graphical interface is configured to generate a database schema with table names based on said section names and columns based on said plurality of vectors.

* * * * *

UNITED STATES PATENT AND TRADEMARK OFFICE
CERTIFICATE OF CORRECTION

PATENT NO. : 11,243,971 B2  
APPLICATION NO. : 16/235369  
DATED : February 8, 2022  
INVENTOR(S) : Arturo Geigel Page 1 of 1

It is certified that error appears in the above-identified patent and that said Letters Patent is hereby corrected as shown below:

On the Title Page

Item (12) change "Geigel" to read as --Geigel et al.--; and

Item (72) change "Arturo Geigel, San Juan, PR (US)" to read as --Arturo Geigel, San Juan, PR (US); Rut Colon, Guaynabo, PR (US); Jose Mayoral, Guaynabo, PR (US)--.

Signed and Sealed this  
Eleventh Day of July, 2023

Katherine Kelly Vidal  
*Director of the United States Patent and Trademark Office*